US010523923B2

(12) United States Patent
Kashyap

(10) Patent No.: US 10,523,923 B2
(45) Date of Patent: Dec. 31, 2019

(54) SYNCHRONIZING ACTIVE ILLUMINATION CAMERAS

(71) Applicant: Microsoft Technology Licensing, LLC., Redmond, WA (US)

(72) Inventor: Abhinav Kashyap, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 14/979,602

(22) Filed: Dec. 28, 2015

(65) Prior Publication Data

US 2017/0188019 A1   Jun. 29, 2017

(51) Int. Cl.
*H04N 13/296* (2018.01)
*H04N 5/232* (2006.01)
*H04N 13/282* (2018.01)

(52) U.S. Cl.
CPC ....... *H04N 13/296* (2018.05); *H04N 5/23206* (2013.01); *H04N 13/282* (2018.05)

(58) Field of Classification Search
CPC .......... H04N 21/4302; H04N 13/0296; H04N 5/23206; H04N 13/282; H04N 13/296
See application file for complete search history.

(56) References Cited

U.S. PATENT DOCUMENTS

| | | |
|---|---|---|
| 5,581,323 A | 12/1996 | Suzuki et al. |
| 5,625,410 A | 4/1997 | Washino et al. |
| 5,717,512 A | 2/1998 | Chmielewski et al. |
| 5,839,000 A | 11/1998 | Davis et al. |
| 6,152,563 A | 11/2000 | Hutchinson et al. |
| 6,778,263 B2 | 8/2004 | Ortyn et al. |
| 7,405,812 B1 | 7/2008 | Bamji |
| 7,542,210 B2 | 6/2009 | Chirieleison, Sr. |
| 7,686,451 B2 | 3/2010 | Cleveland |
| 7,912,252 B2 | 3/2011 | Ren et al. |
| 8,063,750 B2 | 11/2011 | Knibbe |
| 8,180,298 B2 | 5/2012 | Drude |
| 8,331,418 B2 | 12/2012 | Chou |
| 8,355,117 B2 | 1/2013 | Niclass |
| 8,408,706 B2 | 4/2013 | Yahav |
| 8,487,838 B2 | 7/2013 | Lewis et al. |
| 8,593,375 B2 | 11/2013 | Maltz |
| 8,602,887 B2 | 12/2013 | Tardif et al. |
| 8,723,924 B2 | 5/2014 | Mirbach et al. |
| 8,872,910 B1 | 10/2014 | Vaziri |
| 8,879,050 B2 | 11/2014 | Ko |

(Continued)

FOREIGN PATENT DOCUMENTS

CN   102073050 B   5/2011
DE   102011089636 A1   6/2012

(Continued)

OTHER PUBLICATIONS

Litos, et al., "Synchronous Image Acquisition based on Network Synchronization", In Proceedings of the Conference on Computer Vision and Pattern Recognition Workshop, Jun. 17, 2006, 6 pages.

(Continued)

*Primary Examiner* — Farzana Hossain

(57) ABSTRACT

Apparatus for controlling a plurality of active illumination cameras to operate in a time division multiplexed operating mode to acquire images of scenes that the cameras image.

20 Claims, 3 Drawing Sheets

(56) References Cited

U.S. PATENT DOCUMENTS

| | | | |
|---|---|---|---|
| 8,888,287 B2 | 11/2014 | Yahav | |
| 8,941,561 B1 | 1/2015 | Starner | |
| 8,998,662 B1 | 3/2015 | Haskin et al. | |
| 8,998,414 B2 | 4/2015 | Bohn | |
| 9,079,103 B2 | 7/2015 | Russo et al. | |
| 9,723,992 B2 | 8/2017 | Senechal et al. | |
| 9,769,368 B1* | 9/2017 | Morford | H04N 5/23206 |
| 2003/0125019 A1 | 7/2003 | Bajikar | |
| 2003/0181213 A1 | 9/2003 | Sugar et al. | |
| 2004/0259589 A1 | 12/2004 | Bahl et al. | |
| 2006/0024041 A1* | 2/2006 | Lou | G06T 7/80 |
| | | | 396/213 |
| 2008/0240048 A1 | 10/2008 | Okker et al. | |
| 2009/0039734 A1 | 2/2009 | Takahashi et al. | |
| 2009/0052037 A1 | 2/2009 | Wernersson | |
| 2009/0141372 A1 | 6/2009 | Trevelyan et al. | |
| 2009/0163185 A1* | 6/2009 | Lim | H04N 5/23206 |
| | | | 455/414.1 |
| 2010/0123770 A1* | 5/2010 | Friel | H04N 7/15 |
| | | | 348/14.08 |
| 2010/0214419 A1* | 8/2010 | Kaheel | H04N 5/272 |
| | | | 348/207.1 |
| 2010/0315905 A1 | 12/2010 | Lee et al. | |
| 2010/0322479 A1 | 12/2010 | Cleveland | |
| 2011/0006978 A1 | 1/2011 | Yuan | |
| 2011/0216744 A1* | 9/2011 | Taaghol | H04W 48/18 |
| | | | 370/332 |
| 2011/0298898 A1 | 12/2011 | Jung et al. | |
| 2012/0033045 A1 | 2/2012 | Schweizer et al. | |
| 2012/0098964 A1 | 4/2012 | Oggier et al. | |
| 2012/0098965 A1 | 4/2012 | Barcala | |
| 2012/0133754 A1 | 5/2012 | Lee et al. | |
| 2012/0230250 A1 | 9/2012 | Kasslin et al. | |
| 2012/0314077 A1 | 12/2012 | Clavenna et al. | |
| 2013/0063550 A1 | 3/2013 | Ritchey et al. | |
| 2013/0128052 A1* | 5/2013 | Catrein | H04N 5/232 |
| | | | 348/159 |
| 2013/0222638 A1 | 8/2013 | Wheeler et al. | |
| 2013/0242058 A1 | 9/2013 | Bak et al. | |
| 2013/0258089 A1 | 10/2013 | Lyons et al. | |
| 2013/0314421 A1 | 11/2013 | Kim | |
| 2014/0043227 A1 | 2/2014 | Skogo et al. | |
| 2014/0055771 A1 | 2/2014 | Oggier | |
| 2014/0071234 A1 | 3/2014 | Millett | |
| 2014/0094307 A1 | 4/2014 | Doolittle et al. | |
| 2014/0104394 A1 | 4/2014 | Yanai et al. | |
| 2014/0133825 A1* | 5/2014 | Kozloski | G11B 27/034 |
| | | | 386/223 |
| 2014/0240464 A1 | 8/2014 | Lee | |
| 2014/0240469 A1 | 8/2014 | Lee | |
| 2014/0266988 A1 | 9/2014 | Fisher et al. | |
| 2014/0333917 A1 | 11/2014 | Payne et al. | |
| 2014/0355947 A1 | 12/2014 | Slamecka et al. | |
| 2015/0002392 A1 | 1/2015 | Kempinski | |
| 2015/0003370 A1 | 1/2015 | Yokomakura et al. | |
| 2015/0009049 A1 | 1/2015 | Subramanya | |
| 2015/0148088 A1 | 5/2015 | Ericson | |
| 2015/0180581 A1 | 6/2015 | Steiner et al. | |
| 2015/0201023 A1* | 7/2015 | Kotab | H04L 65/60 |
| | | | 709/208 |
| 2015/0238079 A1 | 8/2015 | Cleveland | |
| 2015/0346814 A1 | 12/2015 | Thukral et al. | |
| 2015/0358584 A1* | 12/2015 | Mattson | H04N 7/15 |
| | | | 348/14.08 |
| 2016/0026253 A1 | 1/2016 | Bradski et al. | |
| 2016/0275641 A1* | 9/2016 | Bostick | H04N 5/225 |
| 2017/0064209 A1 | 3/2017 | Cohen et al. | |
| 2017/0094248 A1 | 3/2017 | Kashyap | |
| 2017/0272731 A1 | 9/2017 | Kashyap | |

FOREIGN PATENT DOCUMENTS

| | | | |
|---|---|---|---|
| EP | 1647839 | A2 | 4/2006 |
| WO | 2007097738 | A3 | 8/2007 |
| WO | 2011084799 | A1 | 7/2011 |
| WO | 2013026678 | A1 | 2/2013 |
| WO | 2013066334 | A1 | 5/2013 |
| WO | 2013127973 | A1 | 9/2013 |
| WO | 2014072100 | A1 | 5/2014 |
| WO | 2014180553 | A1 | 11/2014 |
| WO | 2015006475 | A1 | 1/2015 |
| WO | 2015066475 | A1 | 5/2015 |
| WO | 2015107529 | A1 | 7/2015 |

OTHER PUBLICATIONS

"About the Motion Capture Module", Retrieved on: Oct. 14, 2015, Available at: http://download.autodesk.com/us/maya/MayaMatchMoverOnlineHelp/index.html?url=WS73099cc142f48755-385a98b012180d20f19-5e06.htm,topicNumber=d0e17487.

Lussier, et al., "Automatic Calibration of RGBD and Thermal Cameras", In Proceedings IEEE International Conference on Intelligent Robots and Systems, Sep. 14, 2014, pp. 451-458.

Basso, et al., "Online Calibration for Networks of Cameras and Depth Sensors", In Proceedings of 12th Workshop on Non-classical Cameras, Camera Networks and Omnidirectional Vision, May 31, 2014, 6 pages.

Jamalabdollahi, et al., "Energy Efficient Ranging in Wireless Sensor Networks via a New Time Slot-based Round-Trip Algorithm", In Proceedings of IEEE Aerospace Conference, Mar. 1, 2014, pp. 1-7.

Chennamma, et al., "A Survey on Eye-Gaze Tracking Techniques", In Proceedings of Indian Journal of Computer Science and Engineering, vol. 4, Issue 5, Oct. 2013, pp. 388-394.

Graupner, et al., "Evaluating Requirements for Gaze-Based Interaction in a See-Through Head Mounted Display", Proceedings of the symposium on Eye tracking research & applications, Mar. 26, 2008, pp. 91-94.

Kozma, et al., "GaZIR: Gaze-based Zooming Interface for Image Retrieval", In Proceedings of the 11th International Conference on Multimodal Interfaces, Nov. 2, 2009, 8 pages.

U.S. Appl. No. 14/542,455, Yahav, et al., "Eyewear-Mountable Eye Tracking Device", filed Nov. 14, 2014.

International Search Report and Written Opinion Issued in PCT Application No. PCT/US2016/048920, dated Nov. 30, 2016, 12 Pages.

International Search Report and Written Opinion Issued in PCT Application No. PCT/US2016/043801, dated Oct. 19, 2016, 11 Pages.

"Second Written Opinion Issued in PCT Application No. PCT/US2016/048920", dated Aug. 31, 2017, 8 Pages.

Non-Final Office Action dated Oct. 3, 2017 for U.S. Appl. No. 14/836,490, filed Aug. 26, 2015.

Non-Final Office Action dated Oct. 24, 2017 for U.S. Appl. No. 14/870,013, filed Sep. 30, 2015.

"International Preliminary Report on Patentability Issued in PCT Application No. PCT/US2016/048920", dated Dec. 19, 2017, 8 Pages.

"International Preliminary Report on Patentability Issued in PCT Application No. PCT/US2016/043801", dated Jul. 17, 2017, 6 Pages.

"Design Principles for Voice Over WLAN", Retrieved From: https://web.archive.org/web/20140227160101/http://www.cisco.com/c/en/us/solutions/collateral/wireless/4400-series-wireless-lan-controllers/net_implementation_white_paper0900aecd804f1a46.html, Retrieved on: Feb. 27, 2014, 16 Pages.

"Final Office Action Issued in U.S. Appl. No. 14/836,490", dated Jun. 8, 2018, 27 Pages.

"Final Office Action Issued in U.S. Appl. No. 14/870,013", dated Jul. 3, 2018, 10 Pages.

Holmlund, Jonas, "Characterization and Compensation of Stray Light Effects in Time of Flight Based Range Sensors", In Master's Thesis in Engineering Physics, Department of Pysics, Umea University, May 2013, 86 Pages.

Kim, et al., "Multi-View Image and ToF Sensor Fusion for Dense 3D Reconstruction", In Proceedings of IEEE 12th International Conference on Computer Vision Workshops, Sep. 27, 2009, 8 pages.

(56) References Cited

OTHER PUBLICATIONS

Payne, et al., "Multiple Frequency Range Imaging to Remove Measurement Ambiguity", In Proceedings of at 9th Conference on Optical 3-D Measurement Techniques, Jul. 1, 2009, pp. 139-148.
"International Search Report and Written Opinion Issued in PCT Application No. PCT/US2017/021472", dated May 29, 2017, 11 Pages.
"Non Final Office Action Issued in U.S. Appl. No. 14/836,490", dated Nov. 19, 2018, 23 Pages.
"Non Final Office Action Issued in U.S. Appl. No. 15/071,246", dated Nov. 19, 2018, 9 Pages.
"Final Office Action Issued in U.S. Appl. No. 14/836,490", dated Mar. 28, 2019, 22 Pages.
"Office Action and Search Report Issued in Chinese Application No. 201680049423.X", dated Apr. 26, 2019, 13 Pages.
"Non Final Office Action Issued in U.S. Appl. No. 14/836,490", dated Sep. 12, 2019, 31 Pages.

\* cited by examiner

SYNCHRONIZING ACTIVE ILLUMINATION CAMERAS

BACKGROUND

A three dimensional (3D) range camera determines distances to features in a scene that it images and may provide the distances in a range image, also referred to as a 3D image, comprising three spatial coordinates for each of the features relative to an origin of coordinates located at the camera. An active illumination range camera provides range images of scenes that it images responsive to light reflected by features in the scene from light that the camera transmits to illuminate the scene. Typically, an active illumination range camera may illuminate a scene with structured or temporally modulated, optionally infrared (IR), light to acquire a range image of the scene. A range camera that illuminates a scene that it range images with structured light determines distances to features in the scene by triangulation to structures in the structured light that are reflected by the features. A range camera that illuminates a scene that it range images with temporally modulated light, determines round trip times for a temporal "marker" of the modulated light to travel from the camera to features in the scene and back to the camera. The camera, also referred to conventionally as a time of flight (TOF) range camera, uses the round trip time determined for a given feature in the scene and the speed of light to determine a distance to the given feature Whereas active illumination range cameras were originally relatively scarce and limited to technical, engineering, and scientific applications, active illumination range imaging technology has matured, and range cameras are frequent components of a continually expanding catalog of consumer products. Range cameras may be found not only in video game consoles, but laptop computers, workbooks, tablets, smartphones, and even wrist watches.

SUMMARY

With the increase in the commercial popularity of range cameras, it is anticipated that various venues may periodically become crowded with many users attempting to simultaneously operate active illumination range cameras to range image scenes in, or from, the venue. And it is expected that when a venue becomes crowded with users operating active illumination range cameras, light transmitted by an active illumination range camera in the venue may interfere with operation of another of the active illumination range cameras operating in the venue. An aspect of an embodiment of the disclosure therefore relates to providing a system, hereinafter also referred to as a "camera synchronization system", a "CAM-Sync system", or "CAM-Sync", configured to coordinate operation of active illumination range cameras operating in a same venue to reduce possible interference between the range cameras. A venue in which active illumination cameras might interfere with each other's operation may be referred to as an imaging neighborhood.

In an embodiment, CAM-Sync comprises an optionally cloud based hub having a database comprising a list of active illumination range cameras subscribed to CAM-Sync, each subscriber camera identified by an ID and configured by a CAM-Sync mobile app (application software), optionally downloaded from the hub. The CAM-Sync app, configures an active illumination range camera in which it is installed to communicate with the hub when it is operating in a same imaging neighborhood with other CAM-Sync subscriber range cameras to establish a time division multiplexing (TDM) imaging mode of operation for the range cameras. The TDM imaging mode provides each camera with an exclusive imaging time slot for acquiring a range image so that at any one time, substantially only one of the range cameras in the imaging neighborhood operates to transmit light and acquire a range image of a scene.

In an embodiment, range cameras subscribed to CAM-Sync provide the CAM-Sync hub with location based data that enables the hub to determine their respective geolocations. CAM-Sync may use the geolocations to determine when more than one range camera subscribed to CAM-Sync is located in a same imaging neighborhood. Upon making such a determination the CAM-Sync hub may implement a TDM imaging mode by transmitting "image-ON" signals to each of the range cameras at different times. In response to receiving the image-ON signals, the range cameras operate to transmit light and acquire range images of a scene or scenes at different times. In an embodiment, the CAM-Sync app in an active illumination range camera subscribed to CAM-Sync configures the camera to determine if another CAM-Sync active illumination range camera is operating in its imaging neighborhood. If a CAM-Sync camera determines that another CAM-Sync camera is operating in its neighborhood, the CAM-Sync cameras in the imaging neighborhood and the CAM-Sync hub cooperate to establish a wireless local area network (WLAN) over which the cameras may communicate to implement a TDM imaging mode so that no two of the range cameras in the imaging neighborhood operate to acquire a range image at substantially a same time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1A:
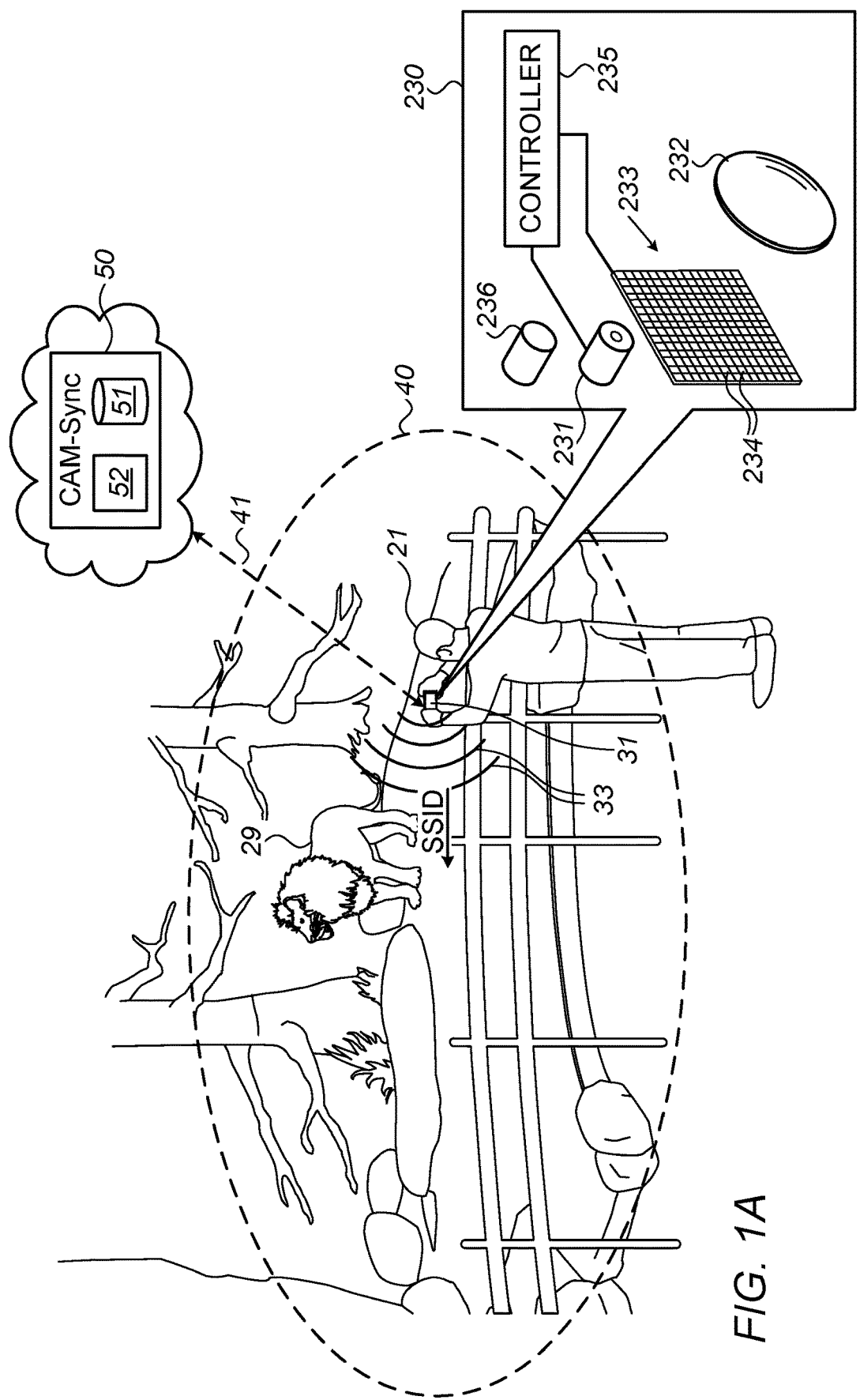
FIG. 1A schematically shows, a CAM-Sync active illumination range camera in an imaging neighborhood communicating with a CAM-Sync hub, in accordance with an embodiment of the disclosure.

In the detailed description below, aspects of a CAM-Sync system comprising an, optionally cloud based, hub that facilitates establishment of a WLAN over which active illumination range cameras in a same imaging neighborhood communicate to operate in a TDM imaging mode in accordance with an embodiment of the disclosure are discussed with reference to FIGS. 1A and 1B. By way of example, the imaging neighborhood schematically shown in the figures is a neighborhood of a lion enclave at a zoo. FIG. 2 schematically shows a CAM-Sync in accordance with an embodiment of the disclosure operating to control a plurality of range cameras at the zoo to operate in a TDM operating mode.

The active illumination range cameras shown in the figures are assumed by way of example to be gated time of flight (GT-TOF) range cameras. A GT-TOF range camera, optionally referred to as a GT-TOF camera, generates and transmits temporally modulated light in a form of a train of light pulses to illuminate a scene that it range images. Following transmission of each light pulse in the train of light pulses, the GT-TOF camera may gate ON for a short exposure period to register amounts of light from the light pulse that features in the scene reflect back to the camera. The GT-TOF camera uses an amount of reflected light that it registers for the reflected light from a given feature in the scene during the short exposure periods following the light pulses to determine a round trip time for the given feature. The GT-TOF cameras in the figures may be independent stand-alone devices or cameras comprised in any of various mobile devices, hereinafter also referred to as "mobile communication devices", configured for communication over a wireless communication network. Mobile communication devices include by way of example, laptop computers, workbooks, tablets, smartphones, cameras, wrist watches, glasses and other wearable devices configured for wireless communication. By way of example, the GT-TOF cameras are assumed to be included in smartphones.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which the embodiment is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins FIG. 1A schematically shows a visitor 21 at a zoo who has just activated a GT-TOF camera 31 optionally comprised in a smartphone to image a lion 29 at the zoo. GT-TOF camera 31 is subscribed to an optionally cloud based CAM-Sync system 50 configured to communicate with subscriber GT-TOF cameras via the internet, in accordance with an embodiment of the disclosure. CAM-Sync 50 optionally comprises a database 51 having a list of GT-TOF cameras subscribed to CAM-sync, and a server 52 that processes communications between CAM-Sync 50 and subscriber GT-TOF cameras, such as GT-TOF camera 31, subscribed to CAM-Sync. GT-TOF camera 31 is configured by an app, a CAM-Sync app, optionally downloaded from CAM-Sync 50 to communicate with CAM-Sync 50 to exchange data, and optionally to receive control messages from CAM-Sync 50 and/or other GT-TOF cameras subscribed to CAM-Sync 50, that control operation of the GT-TOF camera in a TDM imaging mode.

GT-TOF camera 31 optionally comprises components that are shown greatly enlarged in an inset 230. It is to be understood that discussion of the components and their operation with respect to GT-TOF camera 31 may apply similarly to other GT-TOF cameras schematically shown in FIGS. 1B and 2. GT-TOF camera 31 comprises an, optionally IR, light source 231, a lens system represented by a lens 232, and a photosensor 233 comprising pixels 234 on which lens system 232 images light received by the camera. A GT-TOF controller 235 in GT-TOF camera 31, controls transmission of light pulse trains by the camera's IR light source 231 and gating ON the camera's photosensor 233 for exposure periods to image and acquire distances to features of a scene, such as lion 29, that the camera range images.

GT-TOF camera 31 may have a communication interface 236 comprising any of various wireless communication interfaces to enable the camera to access the internet and communicate with CAM-Sync 50 and/or to communicate in accordance with a wireless communication protocol directly on a peer to peer basis with other GT-TOF cameras subscribed to CAM-Sync 50. By way of example, communication interface 236 may comprise at least one of or any combination of more than one of WiFi, WiFi direct, and/or blue tooth radio interface to facilitate wireless connection to the internet and CAM-Sync 50, and to facilitate direct peer to peer wireless communication with other GT-TOF cameras subscribed to CAM-Sync 50. GT-TOF camera 31 may also be configured to communicate with other subscriber GT-TOF cameras using acoustic signaling.

An embodiment of controller 235 of GT-TOF camera 31 may comprise any electronic and/or optical processing and/or control circuitry, to provide and enable functionalities that the camera may require to support range imaging and/or communication with CAM-Sync 50 and other subscriber GT-TOF cameras. By way of example, GT-TOF camera 31 may comprise any one, or any combination of more than one of, a microprocessor, an application specific circuit (ASIC), field programmable array (FPGA) and/or system on a chip (SOC). The GT-TOF camera may comprise a memory having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM). Assuming as noted above that GT-TOF camera 31 is comprised in a smartphone, imaging and communication functionalities of GT-TOF camera 31 may be supported by processor and memory circuitry comprised in the smartphone that support smartphone functionalities.

Upon being turned on to acquire a range image, GT-TOF camera 31 is configured to transmit a sign-in message to CAM-Sync 50 advising that it has been turned on, provide CAM-Sync 50 with an ID of the GT-TOF camera, and transmit data to CAM-Sync 50 defining the camera's geo-location. In an embodiment, the ID code transmitted by a GT-TOF camera 31 is an international mobile subscriber identity (IMSI) code of the subscriber identity module (SIM) in the smartphone that comprises the GT-TOF camera. Optionally, upon receipt of the ID code CAM-Sync 50 authenticates the ID code to determine that GT-TOF camera 31 is indeed a GT-TOF camera subscribed to CAM-Sync 50. If authenticated, CAM-Sync 50 transmits a sign-in acknowledgement message to GT-TOF camera 31 confirming sign-in. In an embodiment, GT-TOF camera 31 is also configured to initiate, substantially upon being turned on, or alternatively, after turn-on, upon receiving a sign-in acknowledgment message from CAM-Sync 50, a radio scan to detect radio broadcasts that indicate that there are other subscriber GT-TOF cameras in an imaging neighborhood of GT-TOF camera 31 that might interfere with operation of GT-TOF camera 31. In FIG. 1A, an imaging neighborhood of GT-TOF camera 31 is schematically indicated by a dashed ellipse 40, and GT-TOF camera 31 is an only GT-TOF camera subscribed to CAM-Sync 50 in the imaging neighborhood. As a result, GT-TOF camera 31 fails to detect any broadcasts that might indicate presence of another subscriber GT-TOF camera in imaging neighborhood 40.

In an embodiment, failing to detect radio broadcasts indicating presence of another subscriber GT-TOF camera in imaging neighborhood 40, GT-TOF camera 31 communicates with CAM-Sync 50 to request that CAM-Sync 50 optionally provide GT-TOF camera 31 with a service set identifier (SSID) for establishing a WLAN and an associated access code that other subscriber GT-TOF cameras may present to GT-TOF camera 31 to be granted access to the WLAN. In response, having authenticated identity of GT-TOF camera 31 as noted above, CAM-Sync 50 transmits a message to GT-TOF camera 31 providing the GT-TOF camera with an SSID and an associated access code. A double arrowhead dashed line 41 schematically represents communication between GT-TOF camera 31 and CAM-Sync 50. Line 41 is labeled with the information that may be communicated between the GT-TOF camera and CAM-Sync 50.

Upon receiving the SSID and associated access code, GT-TOF camera 31 broadcasts a beacon comprising the SSID to disclose presence of GT-TOF camera 31 and availability of a WLAN identified by the SSID. Cascaded arcs 33 schematically represent the beacon transmitted by GT-TOF camera 31. Optionally, in the message that CAM-Sync 50 transmits to GT-TOF camera 31 to provide the camera with the SSID and access code, CAM-Sync 50 provides GT-TOF camera 31 with a transmission signal strength at which to transmit beacon 33. In an embodiment, CAM-Sync 50 determines the transmission signal strength to limit a broadcast range for which beacon 33 may effectively be detected and recognized by other subscriber GT-TOF cameras. The transmission signal strength and resulting broadcast range of the beacon may be determined to define an extent of imaging neighborhood 40. Optionally, in the acknowledgment message transmitted to GT-TOF camera 31 CAM-Sync 50 provides GT-TOF camera 31 with a radiant power level at which to transmit light pulses that the GT-TOF camera transmits to illuminate lion 29 and acquire a range image of the lion. In an embodiment CAM-Sync 50 determines the broadcast range of beacon 33 based on the radiant power level at which GT-TOF camera 31 operates so that beyond the beacon broadcast range, light pulses transmitted by GT-TOF camera 31 do not substantially interfere with operation of other, similar GT-TOF cameras. As long as no other subscriber GT-TOF camera operates within imaging neighborhood 40, GT-TOF camera 31 images lion 29 without time constraints.

Figure 1B:
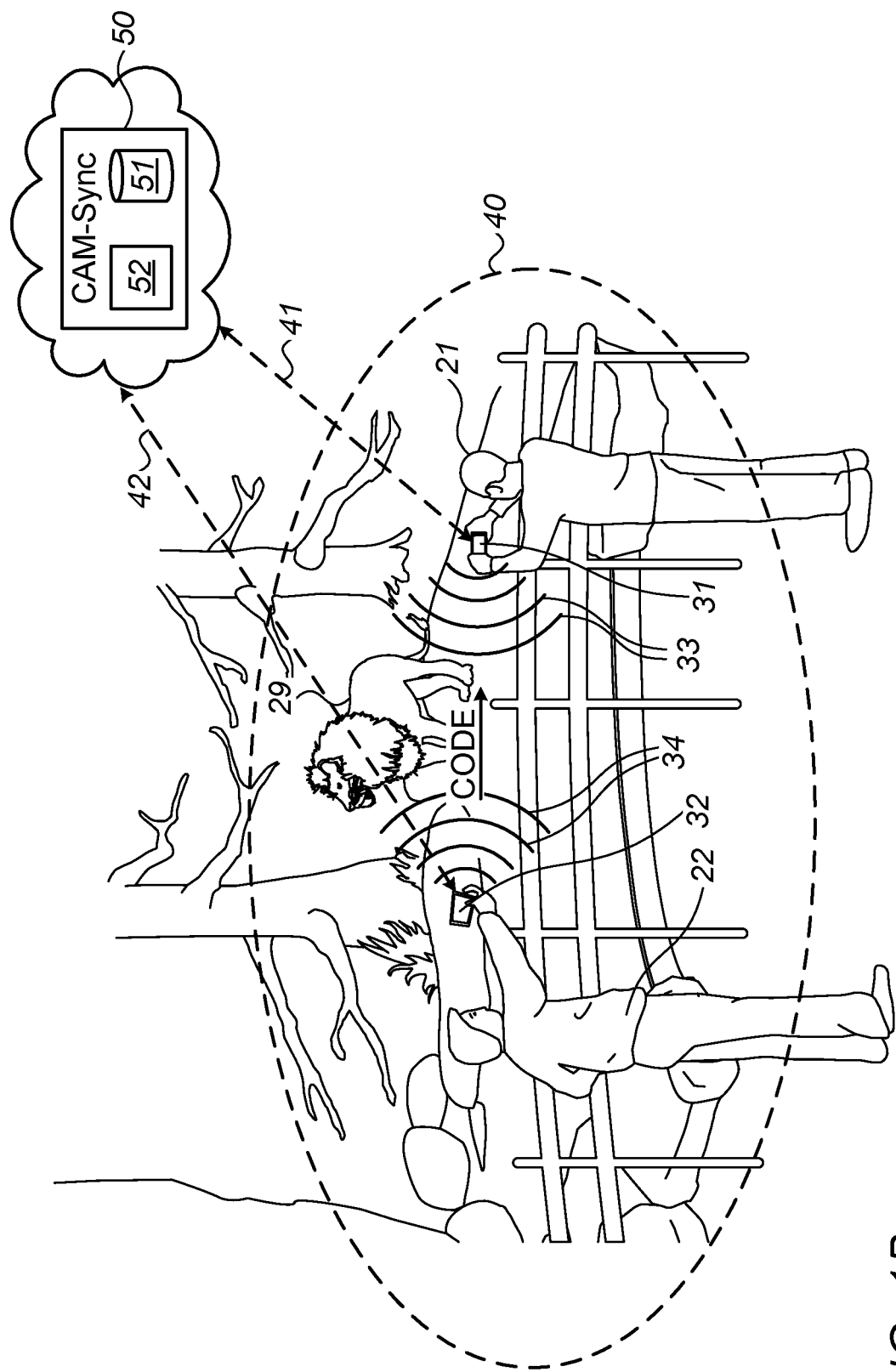
FIG. 1B schematically shows the CAM-Sync active illumination range camera shown in FIG. 1A interacting with another CAM-Sync active illumination range camera in the imaging neighborhood to establish a WLAN and operate in a TDM imaging mode, in accordance with an embodiment of the disclosure.
Figure 2:
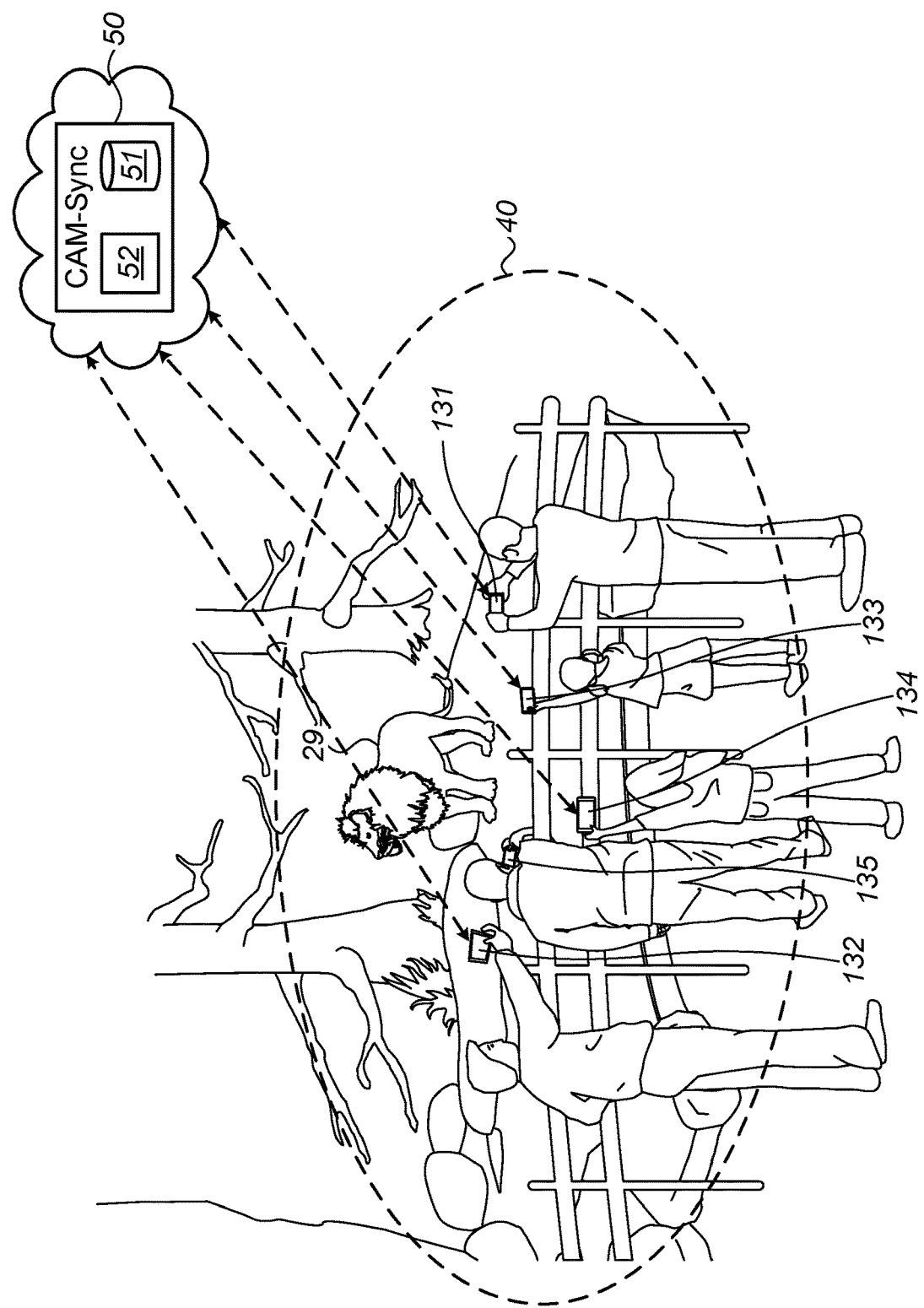
FIG. 2 schematically shows a CAM-Sync hub controlling active illumination range cameras in a same imaging neighborhood to operate in a TDM imaging mode, in accordance with an embodiment of the disclosure.

FIG. 1B schematically shows imaging neighborhood 40 after a visitor 22 to the zoo has brought a second GT-TOF camera 32 subscribed to CAM-Sync 50 to imaging neighborhood 40 and turned on the camera to range image lion 29. Optionally, upon being turned on in imaging neighborhood 40, GT-TOF camera 32 transmits the same type of data to CAM-Sync 50 that GT-TOF camera 31 transmitted to the CAM-Sync when GT-TOF camera 31 was turned on. Upon receiving the data transmitted by GT-TOF camera 32 CAM-Sync 50 may transmit an acknowledgement message to GT-TOF camera 32 comprising a threshold reception signal strength for detecting a beacon transmitted by another subscriber GT-TOF camera, such as GT-TOF camera 31. In an embodiment, having been notified of the presence of GT-TOF camera 32 in imaging neighborhood at the lion enclave, and assigning GT-TOF camera 31 a transmission signal strength for transmitting beacon 33, CAM-Sync 50 sets the reception signal strength assigned to GT-TOF camera 32 responsive to the transmission signal strength of beacon 33 to determine an extent of imaging neighborhood 40.

Upon receiving the acknowledgement message from CAM-Sync 50, GT-TOF camera 32 initiates scanning for radio transmissions from other subscriber GT-TOF cameras. However, unlike the scan performed by GT-TOF camera 31 discussed above, the radio scan performed by GT-TOF camera 32 results in GT-TOF camera 32 detecting a beacon transmitted by another subscriber GT-TOF camera in neighborhood 40—beacon 33 transmitted by GT-TOF camera 31. Upon detecting beacon 33 transmitted by GT-TOF camera 31, GT-TOF camera 32 processes the beacon to determine the SSID the beacon encodes, and transmits a message that informs CAM-Sync 50 that GT-TOF camera 32 has detected beacon 33 encoding the SSID and requests the access code associated with the SSID so that GT-TOF camera 32 can join the WLAN identified by the SSID. In FIG. 1B a double arrowhead dashed line 42 represents communication between GT-TOF camera 32 and CAM-Sync 50. Upon receiving the access code, GT-TOF camera 32 transmits a "request message" to GT-TOF camera 31 encoding the ID of GT-TOF camera 32 requesting access to the WLAN and presenting the access code. A cascade of arcs 34 represents the message that GT-TOF camera 32 transmits to GT-TOF camera 31 requesting access to the WLAN.

Upon receiving the ID and access code from GT-TOF camera 32, GT-TOF camera 31 allows GT-TOF camera 32 access to the WLAN and transmits messages to GT-TOF camera 32 over the WLAN that instructs GT-TOF camera 32 to operate as a "slave" in a TDM imaging mode administered by GT-TOF camera 31 operating as a "master" of the WLAN. Operating as a master, GT-TOF camera 31 allocates imaging time slots to time division multiplex operation of both GT-TOF cameras 31 and 32 so that the GT-TOF cameras range image lion 29 at different times. Master GT-TOF camera 31 acquires range images only during imaging time slots that the master GT-TOF camera allocates to itself, and slave GT-TOF camera 32 acquires range images only during imaging time slots that master GT-TOF camera 31 allocates to slave GT-TOF camera 32.

In an embodiment, master GT-TOF camera 31 alerts slave GT-TOF camera 32 to an onset of an allocated imaging time slot by transmitting over the WLAN an image-ON signal. An image-ON signal may encode the ID of slave GT-TOF camera 32, a start time of an imaging time slot allocated to the slave GT-TOF camera and a duration of the imaging time slot. The duration of an imaging slot that master GT-TOF camera 31 allocates to slave GT-TOF camera 32 and/or frequency with which master GT-TOF camera 31 allocates imaging time slots to slave GT-TOF camera 32 may be customized to the slave camera's operating profile. Master GT-TOF camera 31 may be informed of slave GT-TOF camera's operating profile by messages that the slave camera transmits or by profile data that CAM-Sync 50 stores in database 51 for GT-TOF camera 31 and makes available to GT-TOF camera 31. For example, the imaging time slot duration may be longer or shorter depending on intensity of illumination slave GT-TOF camera 32 is able to provide to illuminate lion 29 to range image the lion. Slave GT-TOF camera 32 may transmit status messages to master GT-TOF camera 31, and/or CAM-Sync 50, comprising "status parameters" indicating how ready slave GT-TOF camera 32 is to use an allocated imaging time lot, or how frequently the slave camera is able to use imaging time slots. The status message may for example, contain data indicating camera temperature, and/or power reserves. Master GT-TOF camera 31 may determine when and/or frequency with which it provides slave GT-TOF camera 32 with imaging time slots responsive to the parameters in the status message. Slave GT-TOF camera 32 optionally transmits a "receipt message" to master GT-TOF camera 31 to acknowledge receipt of an image-On signal that it receives from the master GT-TOF camera.

Additional subscriber GT-TOF cameras that enter imaging neighborhood 40 may communicate with CAM-Sync 50 and GT-TOF camera 31 similarly to the manner in which GT-TOF camera 32 communicated with CAM-Sync 50 and GT-TOF camera 31 to access and become a member of the WLAN, and operate as a slave in the TDM imaging mode administered by master GT-TOF camera 31. In an embodiment, each member GT-TOF camera of the WLAN established to support the TDM imaging mode for GT-TOF cameras located in imaging neighborhood 40 may periodically broadcast the SSID of the WLAN to alert non-member GT-TOF cameras to the existence of imaging neighborhood 40 and the neighborhood's TDM imaging mode that the WLAN supports. Alerted non-members may communicate with CAM-Sync 50 to acquire the access code needed for joining the WLAN and participating in the TDM imaging mode administered for imaging neighborhood 40. Having all members of the WLAN broadcasting the WLAN SSID enables non-member GT-TOF cameras that are too far from master GT-TOF camera 31 to effectively detect beacons that the master camera transmits, to join the WLAN, and enables imaging neighborhood 40 to grow as might be needed substantially independent of a range of beacons transmitted by any of the GT-TOF cameras that are members of the WLAN.

A slave GT-TOF camera may exit the TDM imaging mode by transmitting an "exit message" to master GT-TOF camera 31, or by not responding with a receipt message in response to an image-ON signal it receives from the master GT-TOF camera. Master GT-TOF camera 31 may relinquish the role as master by transmitting a "master exit" message to a slave GT-TOF camera appointing the slave GT-TOF as a new master to administer the WLAN and TDM operation of remaining GT-TOF slave cameras active in neighborhood 40.

It is noted that the physical extent of imaging neighborhood 40 is not static and may grow or shrink as GT-TOF cameras subscribed to CAM-Sync 50 enter or leave the imaging neighborhood. A GT-TOF camera, such as GT-TOF camera 31 or 32 may enter an imaging neighborhood by physically entering the neighborhood while on, or by being turned on while in the neighborhood. A GT-TOF camera, may exit an imaging neighborhood by physically leaving the neighborhood while on, or by being turned off.

In an embodiment of the disclosure CAM-Sync 50 may implement a TDM imaging mode for a plurality of subscriber GT-TOF cameras by directly allocating imaging time slots to the GT-TOF cameras. FIG. 2 schematically illustrates CAM-Sync 50 directly administering a TDM imaging mode for a plurality of, by way of example five, GT-TOF cameras 131, 132, ..., 135 located in imaging neighborhood 40.

In an embodiment each GT-TOF camera 131, ..., 135 subscribed to CAM-Sync 50 is configured by a CAM-Sync app it comprises to repeatedly communicate to CAM-Sync 50 when the GT-TOF camera is turned on to be used to acquire a range image, the ID of the GT-TOF camera and data that may be used to determine a geolocation of the GT-TOF camera. CAM-Sync 50 may processes the ID and geolocation data to determine when two or more GT-TOF cameras subscribed to CAM-Sync 50 become close enough to create an imaging neighborhood in which the cameras may interfere with each other's operation. When such a situation comes about, as schematically shown in FIG. 2 for the lion enclave and GT-TOF cameras 131, ..., 135, CAM-Sync 50 transmits a TDM control signal to each GT-TOF camera that prevents the GT-TOF camera from operating, and by way of example, transmitting light to illuminate and range image lion 29 unless the GT-TOF camera receives an image-ON signal from CAM-Sync 50.

As for the case of establishing a WLAN that enables GT-TOF cameras to communicate on a peer to peer basis and cooperate in administering a TDM imaging mode, discussed above with respect to FIGS. 1A and 1B, each image-ON signal that CAM-Sync 50 transmits may encode the ID of a GT-TOF camera 131, ..., 135 to address the image-ON signal to its intended destination GT-TOF camera, a start time of an imaging time slot allocated to the GT-TOF camera, and a duration of the imaging time slot. The duration of an imaging slot allocated to a destination GT-TOF camera 131, ..., 135 and/or frequency with which CAM-Sync 50 allocates imaging time slots to the destination camera may be customized to the camera's operating profile. For example, the imaging time slot duration may be longer or shorter depending on intensity of illumination that the GT-TOF camera is able to provide to illuminate lion 29 to range image the lion. And, in an embodiment, each GT-TOF camera 131, ..., 135 may transmit a status message to CAM-Sync 50 that provides CAM-Sync 50 with status parameters indicating availability of the camera for using an allocated imaging time lot, or how frequently the camera is able to use imaging time slots. CAM-Sync 50 may determine when and/or frequency with which it provides the GT-TOF camera with imaging time slots responsive to the parameters in the status message.

It is noted, that whereas in the above discussion a CAM-Sync and TDM imaging modes are described with respect to active illumination GT-TOF cameras CAM-Syncs and TDM operating modes in accordance with embodiments of the disclosure are applicable to managing operations of any types of cameras that might interfere with each other's operations when operating in a same venue. For example a CAM-Sync may establish, and/or manage TDM operating modes in accordance with an embodiment of the disclosure for structured light cameras, strobe cameras, and/or flash cameras.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of the various embodiments in the present application are provided by way of example and are not intended to limit the scope of the claimed subject matter. The described embodiments comprise different features, not all

The invention claimed is:

1. A system for controlling operation of a plurality of active illumination cameras, the system comprising:
a hub configured to communicate with mobile communication devices and comprising a database comprising a list of active illumination cameras subscribed to the system that are configured to communicate with the hub and a server configured to process communications between the hub and the active illumination cameras subscribed to the system;
a first active illumination camera from the active illumination cameras subscribed to the system, the first active illumination camera configured to image one or more objects in a scene;
a second active illumination camera from the active illumination cameras subscribed to the system, the second active illumination camera configured to image the one or more objects in the scene,
the hub further configured to determine that an operation of the first active illumination camera would interfere with an operation of the second active illumination camera, and
based on the determination that the operation of the first active illumination camera would interfere with an operation of the second active illumination camera the second active illumination camera communicates with the hub to establish a time division multiplexing (TDM) imaging mode of operation in which at any one time, only the first active illumination camera or the second active illumination camera operates to image the one or more objects in the scene.

2. The system according to claim 1 wherein the active illumination cameras subscribed to the system are configured to establish a wireless local area network (WLAN) over which cameras in an imaging neighbourhood communicate to implement the TDM imaging mode.

3. The system according to claim 2 wherein a first set of the active illumination cameras subscribed to the system is configured to perform a radio scan after being turned on in the imaging neighbourhood to detect a radio beacon broadcast by a second set of the active illumination cameras subscribed to the system in the imagining neighbourhood, the radio beacon comprising a service set identifier (SSID) for the WLAN.

4. The system according to claim 3 wherein if the first set of the active illumination cameras do not detect the radio beacon the camera is configured to communicate with the hub and request an SSID for establishing the WLAN, and an access code that another camera may present to be granted access to the WLAN.

5. The system according to claim 4 wherein the hub is configured to respond to the request and communicate an SSID and access code to the first set of the active illumination cameras.

6. The system according to claim 5 wherein upon receiving the SSID and access code the first set of the active illumination cameras is configured to:
broadcast a radio beacon comprising the SSID;
assume a role as master camera of the WLAN that accepts as members of the WLAN in the role of slaves, other of the first set of the active illumination cameras that detect the beacon and transmit a request comprising the access code to join the WLAN; and
administer the TDM imaging mode of operation by allocating imaging time slots to slave cameras during which the slave cameras are allowed to image a scene.

7. The system according to claim 6 wherein the master camera is configured to allocate an imaging time slot to a slave camera by transmitting an image-ON message to the slave camera over the WLAN.

8. The system according to claim 7 wherein the image-On message comprises an ID of the slave camera for which the image-ON message is intended, a start time of the imaging time slot, and a duration of the imaging time slot.

9. The system according to claim 8 wherein the master camera is operable to receive an operating profile of the slave camera that is transmitted to the master camera over the WLAN, and customize the imaging time slot for the slave camera based on the operating profile.

10. The system according to claim 9 wherein the operating profile comprises one or more of the following: an intensity of light that the slave camera transmits to illuminate a scene it images; a pulse width for light pulses that the slave camera transmits to illuminate a scene it images; a repetition frequency for light pulses that the slave camera transmits to illuminate a scene it images; and a wavelength of light that the slave camera transmits to illuminate a scene it images.

11. The system according to claim 8 wherein the master camera is operable to receive a status message comprising status parameters for the slave camera that is transmitted to the master camera over the WLAN, and customize the imaging time slot for the slave camera based on the status message.

12. The system according to claim 8 wherein the status message comprises one or more of the following: slave camera temperature; slave camera power reserves; availability for using an allocated imaging time slot; and a frequency at which the slave camera can use imaging time slots.

13. The system according to claim 3 wherein if the first set of the active illumination cameras detect the radio beacon, the first set of the active illumination cameras is configured to communicate with the hub to:
request and receive the access code for the WLAN from the hub;
upon receiving the access code submit a request to the other of the first set of the active illumination cameras acting as a master of the WLAN, to join the WLAN as a slave to the master; and
upon joining the WLAN receive imaging time slots that the master allocates during which the active illumination camera as a slave camera is allowed to image a scene.

14. The system according to claim 1 wherein each of the active illumination cameras subscribed to the system is configured to communicate with the hub when the active illumination camera is turned on, to transmit to the hub, data that may be used to determine a geolocation of the active illumination camera.

15. The system according to claim 14 wherein the hub is configured to process the geolocation data it receives from the active illumination cameras subscribed to the system to determine when two or more of the active illumination cameras subscribed to the system are in a same imaging neighborhood in which the active illumination cameras subscribed to the system may interfere with each other's operation.

16. The system according to claim 15 wherein upon determining that two or more of the active illumination cameras subscribed to the system are located in a same imaging neighbourhood, the hub is configured to communicate with the active illumination cameras subscribed to the system to allocate imaging time slots to the active illumination cameras subscribed to the system in the neighbourhood so that the active illumination cameras subscribed to the system operate in the TDM imaging mode.

17. The system according to claim 16 wherein the hub is configured to allocate an imaging time slot to a camera from the active illumination cameras subscribed to the system by transmitting an image-ON message to the camera over the WLAN, the image-On message comprising an ID of the camera for which the image-ON message is intended, a start time of the imaging time slot, and a duration of the imaging time slot.

18. The system according to claim 1 wherein the first active illumination camera comprises one of the following: a time of flight (TOF) range camera, a structure light range camera, a strobe camera, and a flash camera.

19. The system according to claim 1 wherein the first and second active illumination cameras are comprised in a mobile communication device selected from: a laptop computer, a workbook, a tablet, a smartphone, a wrist watch, and glasses.

20. A method of imaging a scene using a plurality of active illumination cameras, the method comprising:
- establishing a wireless local area network (WLAN) over which the plurality of active illumination cameras communicate;
- causing, by one or more processors, a first active illumination camera from the plurality of active illumination cameras to image one or more objects in a scene;
- causing, by the one or more processors, a second active illumination camera from the plurality of active illumination cameras to image the one or more objects in the scene,
- determining that an operation of the first active illumination camera would interfere with an operation of the second active illumination camera, and
- based on the determination that the operation of the first active illumination camera would interfere with the operation of the second active illumination camera, establishing, by the one or more processors, a time division multiplexing (TDM) imaging mode of operation in which at any one time, only the first active illumination camera or the second active illumination camera in the imaging neighbourhood operates to image the one or more objects in the scene.

* * * * *